United States Patent [19]

Sheth et al.

[11] Patent Number: 4,917,874

[45] Date of Patent: Apr. 17, 1990

[54] DESULFURIZATION PROCESS

[75] Inventors: Atul C. Sheth, Tullahoma, Tenn.; William A. Butler, Raleigh, N.C.

[73] Assignee: The University of Tennessee Research Corporation, Knoxville, Tenn.

[21] Appl. No.: 211,493

[22] Filed: Jun. 24, 1988

[51] Int. Cl.$^4$ .......................... C01B 17/00; B01J 8/00
[52] U.S. Cl. ..................................... 423/244; 423/242
[58] Field of Search ............... 423/242 A, 244 R, 230, 423/242, 244 A

[56] References Cited

U.S. PATENT DOCUMENTS

| 1,271,899 | 7/1918 | Howard et al. | 310/11 |
|---|---|---|---|
| 3,214,616 | 10/1965 | Way et al. | 310/11 |
| 3,247,405 | 4/1966 | Rosner | 310/11 |
| 3,303,364 | 2/1967 | Hals | 310/11 |
| 3,337,759 | 8/1967 | Daman | 310/11 |
| 3,720,850 | 3/1973 | Way | 310/11 |
| 3,846,535 | 11/1974 | Fonseca | 423/242 |
| 3,879,521 | 4/1975 | Anderson | 423/242 |
| 3,895,243 | 7/1975 | Amend et al. | 310/11 |
| 3,932,587 | 1/1976 | Grantham et al. | 423/242 |
| 3,987,147 | 10/1976 | Guerrieri | 423/242 |
| 4,141,961 | 2/1979 | Miller | 423/563 |
| 4,201,753 | 5/1980 | Dayen | 423/242 |
| 4,239,996 | 12/1980 | Bhada et al. | 310/11 |
| 4,247,525 | 1/1981 | Voeste | 423/242 |
| 4,255,388 | 3/1981 | Miller | 422/168 |
| 4,256,713 | 3/1981 | Urban | 423/242 |
| 4,309,398 | 1/1982 | Sheth | 423/428 |
| 4,354,354 | 10/1982 | Wysk et al. | 60/655 |
| 4,385,039 | 5/1983 | Lowell et al. | 423/242 |
| 4,528,173 | 7/1985 | Seamans | 423/421 |

OTHER PUBLICATIONS

E. G. Kaup et al., Preliminary Design Report, Acid Mine Drainage Demonstration Project, 7/31/69, pp. 1–79.

Rohm and Haas, Desal Process, pp. 1–30.

Primary Examiner—Gregory A. Heller
Attorney, Agent, or Firm—Luedeka, Hodges & Neely

[57] ABSTRACT

Alkali metal sulfates are converted to a sulfur-free form by dissolving the alkali metal sulfate in water to produce an aqueous solution containing alkali metal ions and sulfate ions at a pH below about 8, and then passing the solution through a weak base, anion exchange resin having bicarbonate ions associated therewith that exchange with the sulfate ions so that the sulfate ions become associated with the resin and the bicarbonate ions become associated with the alkali metal ions in the solution. The resin can be regenerated to the bicarbonate form by treatment with an ammonium hydroxide solution followed by contact with carbon dioxide and the regeneration by-products are commercially useful.

27 Claims, 8 Drawing Sheets

DESULFURIZATION PROCESS

The present invention relates to processes for desulfurizing alkali metal sulfates. It is particularly useful in desulfurizing alkali metal sulfates from various industrial materials.

Processes employing or producing alkali metal sulfates are encountered in numerous industries, e.g. in flue gas treatment from fossil fuel plants, effluent and waste materials from papermaking processes, etc.

Many processes have been developed for desulfurizing alkali metal sulfates. They are well-known in the literature and include the PERC process, the Aqueous Carbonate, Modified Tampella, Westinghouse, and Carbon-Reduction Processes; the Formate, Econoseed, Engel-Precht Process and Double Decomposition Precipitation-type Processes. Each of the known processes suffers from some significant disadvantage and, as a result, no one process has been widely adopted. These disadvantages include high energy requirements, poor efficiency, control difficulties, and process-related environmental and materials problems.

In the typical coal-fired electric generating plant, it is usually necessary to reduce the amount of sulfur dioxide in the flue gas to environmentally acceptable discharge levels, particularly in the case of high sulfur coals. In the past, most utilities have used the lime/limestone scrubbing process for FGD. However, this process produces copious amounts of sludge which must be disposed of. The cost of disposing of the sludge has increased dramatically since the onset of the Resource Conservation and Recovery Act and the Toxic Substances Control Act, and various processes have been proposed to replace the conventional lime/limestone scrubbing method in an attempt to avoid this increased cost.

To date, no process has been devised which offers an across-the-board improvement over the conventional flue gas desulfurization (PCD) methods. For example, the Wellman-Lord and Magnesia scrubbing processes which are aimed at eliminating the formation of sludge either create a new disposal problem (sulfate disposal in the Wellman-Lord Process) or impose significant material handling problems and have questionable reliability (the MgO scrubbing process).

Processes involving alkali metal-based dry injection have also been proposed. In principle, these processes appear promising because they avoid the complexity of recirculating slurries and the associated chemical scaling. However, the alkali metal-based dry injection methods are uneconomical because of the high costs associated with using sodium and potassium salts, their relative unavailability in large quantities, and the problems associated with disposing of the spent alkali metal sulfates and other products of the processes.

The same problems with FGD that have existed in conventional coal-fired plants also exist in coal-fired magnetohydrodynamic (MHD) power generation. In an MHD system, electricity is generated by passing a high-temperature, high velocity, electrically conductive working fluid through a magnetic field. In a coal-fired, open-cycle MHD system, the working fluid is obtained by combusting the coal and seeding the combustion gases with an easily ionizable seed material such as a potassium or cesium salt. The seed material is injected and the combustion gas/seedant mixture is fed into the MHD channel. There, the interaction of the magnetic field and the ionized plasma results in an induced voltage that is tapped by electrodes, producing DC electrical power which can then be converted to AC power.

In addition to having higher efficiency than other fossil-fueled power systems, MHD power systems have the advantage of a self-contained sulfur removal capability. That is, potassium salts, which are the generally preferred seed material, also react with sulfur dioxide in the combustion gas to produce potassium sulfate which facilitates removal of the sulfur dioxide from the flue gas before discharge. However, the seed material is not available in large quantities and is quite expensive, and there is no significant commercial demand for the products of the process. The absence of an acceptable method for desulfurizing the alkali metal sulfates produced in an MHD process has been a significant impediment to full scale development of MHD power generation.

Accordingly, it is an object of the present invention to provide a process for the desulfurization of alkali metal sulfates.

Another object of the invention is the provision of a method for the desulfurization of alkali metal sulfates which is carried out using simple, economical processing techniques.

A further object of the invention is the provision of a method of the character described which is carried out primarily under aqueous conditions at relatively low temperature.

Still another object of the invention is the provision of a method of the character described in which the by-products are commercially valuable and/or environmentally benign and wherein the alkali metal is recovered.

An additional object of the invention is to provide an FGD method involving the use of alkali metal sulfates wherein the alkali metal sulfates are desulfurized in accordance with the above objects, and enabling reuse of the alkali metal-based sorbent for $SO_2-$ capture.

Yet another object of the invention is to provide an an FGD method of the character described which is adapted for use in both conventional coal-fired power plants and in MHD power plants.

The above and other objects and advantages of the present invention will be apparent to those of ordinary skill in the art to which the invention pertains from the following detailed description considered in conjunction with the accompanying drawings in which.

Figure 1:
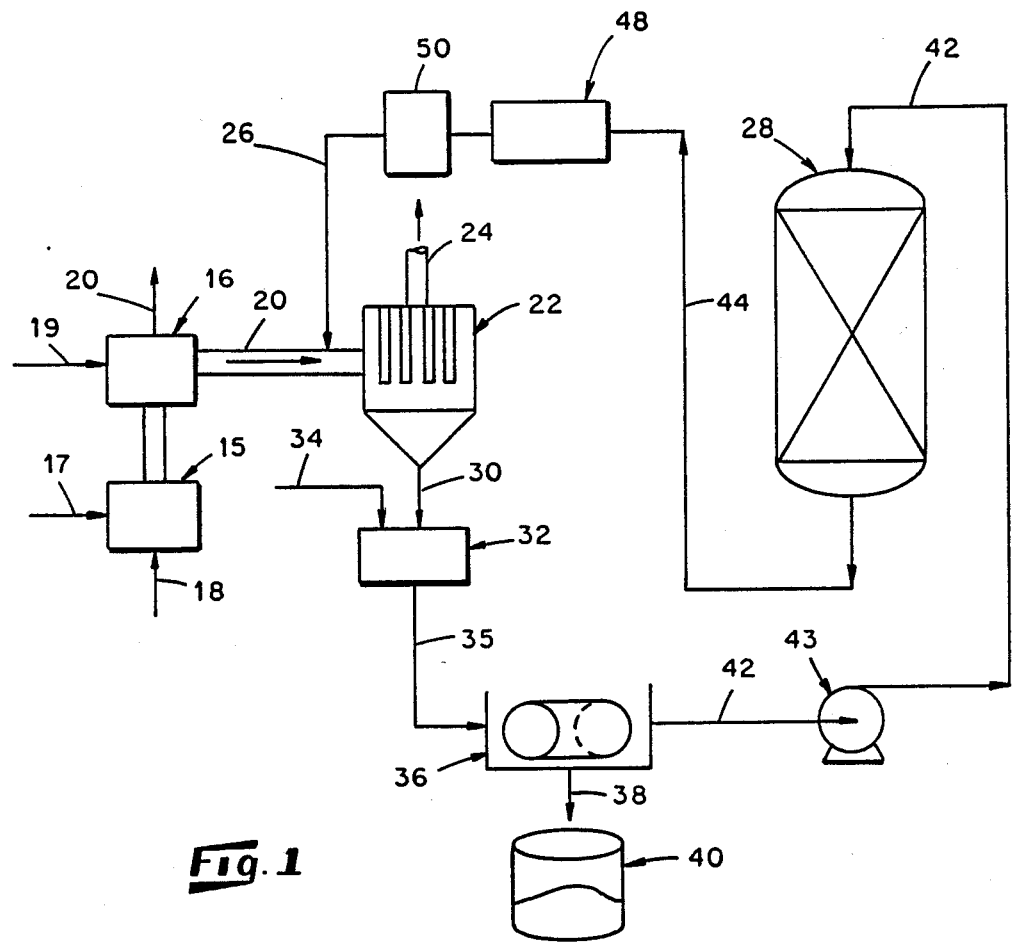
FIG. 1 is flow diagram illustrating features of an FGD process for use in a conventional coal-fired power plant in accordance with one embodiment of the present invention.

In accordance with its more general aspects, the present invention involves a method for desulfurizing a alkali metal sulfates which comprises dissolving the alkali metal sulfate in water to produce an aqueous solution having a pH below about 8 and including sulfate ions and ions of the alkali metal. The solution is then contacted with a weak base, anion exchange resin having anion groups associated therewith, preferably bicarbonate ions, which exchange with the sulfate ions so that the sulfate ions become associated with the resin and the bicarbonate ions become associated with the alkali metal ions in the solution, thereby converting the alkali metal sulfate to a sulfur-free form.

The replacement of bicarbonate ions on the resin with sulfate ions is referred to as the exhaustion of the resin and it occurs according to the affinity of a weak base, anion-exchange resin for various anions as follows:

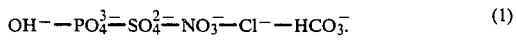

$$OH^- - PO_4^{3-} = SO_4^{2-} = NO_3^- - Cl^- - HCO_3^-. \quad (1)$$

Chong Sho Chemical Fraternity, "Application of Ion Exchange Technique in Seed Regeneration Experiments for MHD Power Generation," Su Chow Area Chemical Institute, China, (1980).

The exhaustion proceeds according to the following reaction:

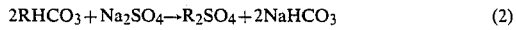

$$2RHCO_3 + Na_2SO_4 \rightarrow R_2SO_4 + 2NaHCO_3 \quad (2)$$

(Here R represents the complex cation groups present in the resin).

A preferred resin for use in the invention is the weak base, gellular, acrylic, anion-exchange resin containing only tertiary amine functional group commercially available under the trademark Amberlite IRA-68 from the Rohm & Haas Company. This resin has a high porosity and an average particle diameter of 0.45 millimeters, and is commercially supplied in a free base or hydroxide form. The active sites in the resin as supplied must be converted to the bicarbonate form before its first time exhaustion or replacement with sulfate ions. This is preferably accomplished by treating the resin with carbonated water to produce active bicarbonate groups according to the following equation:

$$ROH + CO_2 \rightarrow RHCO_3. \quad (3)$$

Once the resin has been exhausted; i.e., its ability to remove sulfate ions falls below an acceptable minimum level due to replacement of the bicarbonate ions with sulfate ions, the resin is regenerated by a method which produces commercially valuable sulfate products. Briefly, the resin is regenerated by contact with an ammonium hydroxide solution to produce an ammonium sulfate solution which can be dried to produce a commercially valuable fertilizer product, or can be treated to recover the ammonia for reuse in the regeneration with a gypsum by-product. After treatment with the ammonium hydroxide solution, the resin is in a hydroxide or free base form and can be converted to the bicarbonate form by contact with carbon dioxide dissolved in water, preferably simultaneously with the exhaustion.

As pointed out above, many applications exist for the desulfurization method of the present invention, e.g. FGD processes, both in conventional fossil fueled power plants and in coal-fired MHD plants. In one FGD embodiment, a sulfur-free alkali metal compound is added in the combustion process to react with the sulfur dioxide present in the flue gas to form an alkali metal sulfate. The alkali metal sulfate is removed from the flue gas using a baghouse or electrostatic precipitator, for example, and is then dissolved in water to produce a solution having a pH below about 8, and including sulfate ions and ions of the alkali metal. The solution is filtered to remove fly ash and like insolubles. The filtered solution is contacted with a weak base, anion-exchange resin having anions associated therewith that exchange with the sulfate ions in the solution so that the sulfate ions become associated with the resin and the anions become associated with the alkali metal ions to form a sulfur-free alkali metal compound in the solution. The sulfur-free alkali metal compound is then recycled to the combustion process.

The invention is advantageous over known FGD processes used in conventional fossil fuel combustors and in coal-fired MHD plants in that the alkali metal used to effect removal of the sulfur dioxide is recycled. This permits an economical mode of operation. Also, the method is carried out under aqueous conditions, but without the sludge problems experienced with known FGD techniques carried out under aqueous conditions.

In accordance with one feature of the FGD method, the flue gas, which contains appreciable quantities of carbon dioxide, is utilized to convert the hydroxide ions on the resin to bicarbonate ions. The flue gas is contacted with the resin (in hydroxide form) along with the alkali metal sulfate solution to convert hydroxide ions to bicarbonate ions which are then exchangeable with the sulfate ions in the solution so that the resin is regenerated, in part, substantially simultaneously with exchange of the bicarbonate ions.

Figure 2:
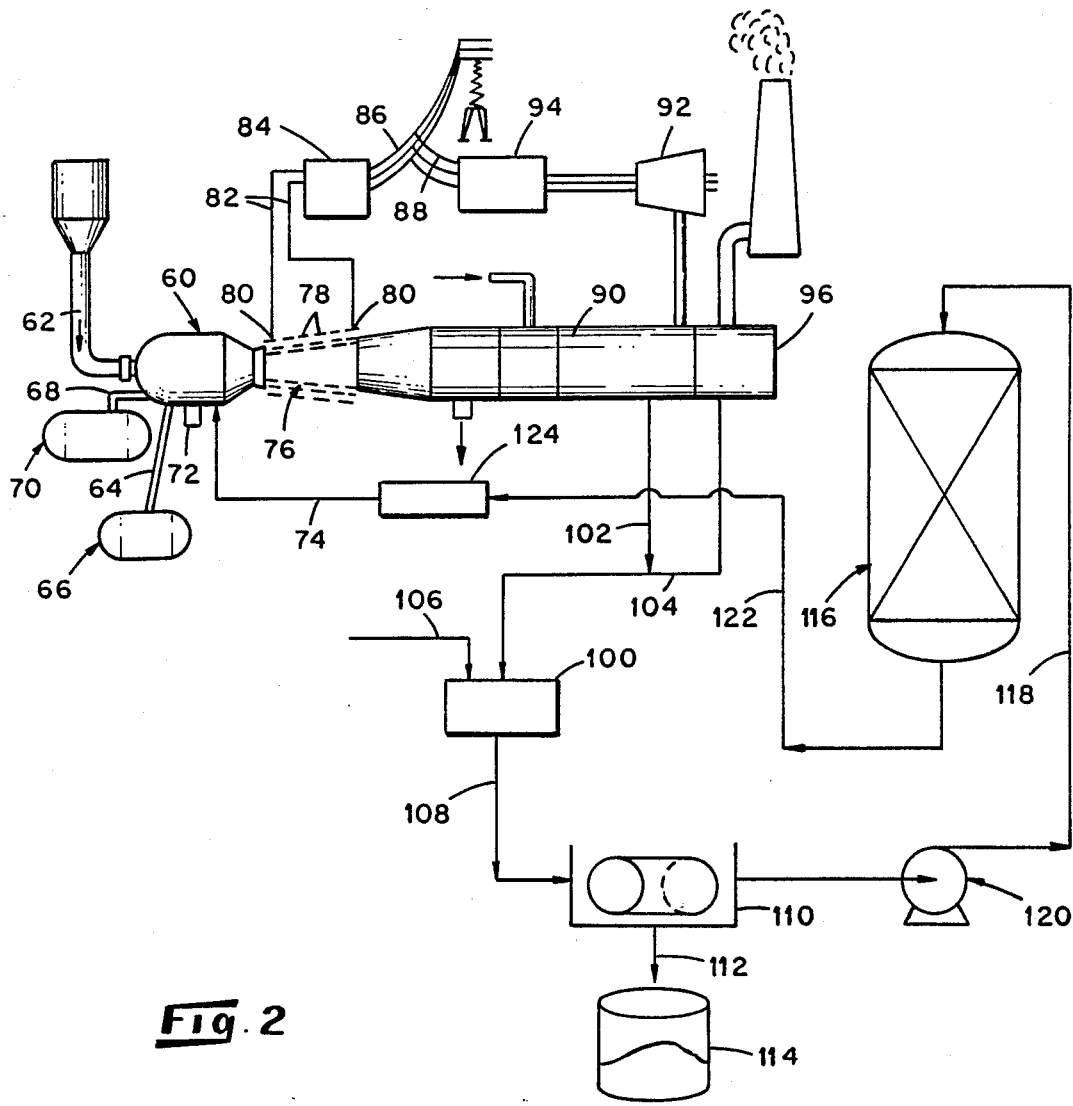
FIG. 2 is a flow diagram illustrating an FGD process for use in an MHD power plant in accordance with another embodiment of the invention.

Further details of the present invention will now be described in connection with its FGD aspects. FIG. 1 illustrates the FGD method of the invention in the context of a conventional coal-fired electric generating facility and FIG. 2 illustrates the FGD method of the invention in the context of an MHD plant. Before discussing the figures, it is noted that the invention makes use of conventional processing equipment and controls for the various unit operations which comprise the method. Accordingly, and for the sake of brevity, the details of the equipment, its operation, and control are omitted herein. For the same reason, piping details, valving, and flow controls and the like are generally omitted.

Referring first to the embodiment of FIG. 1, coal combustion in a combustor 15 produces hot combustion gases which are contacted with the heat exchanger tubes of a boiler 16 in a conventional fashion. Coal and air are fed to the combustor 15 as at 17 and 18, respectively. Water enters the boiler 16 as at 19, leaves as vapor as at 20, and is used to generate electricity in a turbine.

Flue gas is conducted from the boiler 16 through conduit 21 to a particulate collection station 22 which may be a baghouse as shown and/or an electrostatic precipitator. From the collector 22, the flue gas travels to the stack through conduit 24.

The flue gas will contain varying quantities of sulfur dioxide depending on the make-up of the coal that is being burned and the combustion conditions. Typically, it is necessary to reduce the concentration of sulfur dioxide to environmentally acceptable levels requiring the use of an FGD process.

In accordance with the present invention, an alkali metal compound, preferably sodium bicarbonate, is introduced into conduit 21 ahead of the collector 22 by means of conduit 26. Conduit 26 leads from an ion exchange column 28 where the sodium bicarbonate is produced as will be described subsequently.

Upon introduction into conduit 21, the sodium bicarbonate reacts with sulfur dioxide contained in the flue gas to form sodium sulfate. The sodium sulfate is collected in the collector 22 along with other solid material present in the flue gas, mainly fly ash consisting predominantly of silicates.

The solids in the collector 22 are passed as at 30 by suitable means such as a screw conveyor, shaker, or the like (not shown) into a dissolver 32 where the they are mixed with water entering in conduit 34 to produce an aqueous solution. The solution includes the collected sodium sulfate in dissolved form so that sulfate ions and ions of the sodium meal will be present. Other soluble components of the collected material may include sodium sulfite, sodium chloride, and sodium fluoride. Also, various compounds of silicon, aluminum, iron, titanium, calcium, magnesium, and potassium may be present in combination with various ions including sulfate, chloride, and fluoride anions. Many of these compounds have significant solubility in water and thus, ionic species other than the sodium and sulfate ions are likely to be present in the solution in significant quantities.

The solution in collector 32 will contain, in addition to dissolved salts, a certain quantity of insoluble material (mainly fly ash). In the present invention, it is preferred that these insoluble materials be removed from the solution by passing the solution from the collector 22 through conduit 35 to a solid-liquid separation device 36 such as the illustrated horizontal-belt continuous vacuum filter. There, the solids are separated from the solution and passed as indicated at 38 to a container 40 through the use of a screw conveyor or other suitable device, for disposal or further treatment.

The solution is passed from the separation device 36 substantially free of solids and conveyed through conduit 42 with the assistance of a pump 43 to the top of the ion exchange column 28 which contains a supply of the Amberlite IRA-68 resin. Preferably, the resin is fixed in the column 28 and the solution moves down through the resin by gravity flow. The bicarbonate ions of the resin exchange with the sulfate ions in the solution so that the sulfate ions become associated with the resin and the bicarbonate ions become associated with the sodium ions to produce sodium bicarbonate in dissolved form.

The sodium bicarbonate in the solution is passed from column 28 via conduit 44 for introduction into the flue gas flowing in conduit 20 toward the particulate collection device 22. Preferably, the sodium bicarbonate is injected into the flue gas in a dry, powdered form. To this end, an evaporator 48 and a spray dryer 49 are employed with the solution shown entering evaporator 48 in conduit 44 and the sodium bicarbonate in a substantially dried (powder) form leaving spray dryer 49 in conduit 26, which in this case may be a hopper, chute, and conveyor-type arrangement or other equipment suitable for conveying the material in powdered form to the flue gas conduit 20 This enables recovery of the water used to dissolve the sodium sulfate in dissolver 32, and heat for the evaporation and drying is economically obtained using the hot flue gases exiting the collector 22.

Preferably, the FGD process of the present invention is carried out on a continuous basis. However, after a given period of operation, the resin contained in column 28 will become exhausted. That is, the ability of the resin to remove sulfate ions from the solution will drop below a predetermined minimum acceptable level due to replacement of the bicarbonate ions on the resin with sulfate ions. To facilitate continuous operation, a plurality of columns 28 may be provided and connected in parallel between conduits 42 and 44. While one of the columns is being exhausted, the other or others may be in the process of being regenerated as described hereinafter.

With a parallel column arrangement, the sulfate ion concentration of the solution in conduit 26 is continuously monitored (or it is monitored at predetermined time intervals) using a suitable on-line detector. Once a predetermined sulfate concentration is detected in the solution flowing in conduit 44, the solution flowing in conduit 42 is switched to a regenerated or, as will be seen, a partially regenerated column so that flow of the solution containing the alkali metal compound in conduit 44 is substantially uninterrupted. Switching the flow in conduit 42 between columns 28 is easily accomplished using conventional, readily available piping, valving, controls and the like. Columns may also be arranged in series so that the sulfate ions are removed in stages and the parallel connection may be provided in each series.

Referring now to FIG. 2, an FGD process involving the desulfurization of alkali metal sulfates is illustrated in the context of an MHD power plant in accordance with another embodiment of the present invention. As shown in the drawing, coal enters a combustor 60 through chute 62, oxygen enters in conduit 64 from a suitable supply indicated at 66, and preheated air enters in conduit 68 from a suitable supply indicated at 70. Slag produced in the coal combustion exits the combustor 60 as at 72.

An easily ionizable seed material such as a potassium or cesium salt, preferably potassium carbonate, is introduced in a dry powder form into the combustor 60 through conduit 74 and mixed with the flue gas produced by the coal burning therein to produce an ionized plasma. In addition to its role in imparting conductivity to the flue gas through thermal ionization, the potassium carbonate also reacts at relatively low temperatures with sulfur dioxide in the flue gas to produce potassium sulfate, facilitating desulfurization of the gas.

The plasma passes out of the combustor 60 to the right as shown in FIG. 2a and enters an MHD channel 76. A magnetic field is provided across the MHD channel 76 by means of magnets 78, and the interaction of the magnetic field and the ionized plasma results in an induced voltage which is tapped by electrodes 80 producing DC current in lines 82. The DC current is converted to AC power in an inverter 84 and is conducted on to the distribution grid as AC current in lines 86.

After exiting the MHD channel 76, the ionized plasma containing the potassium and sulfate species passes through additional stages and ultimately is employed to produce a flow of AC current in lines 88 using a conventional boiler, steam turbine, and inverter indicated at 90, 92, and 94, respectively. At a temperature less than about 2500° F. potassium combines with sulfur dioxide to form potassium sulfate. From the boiler 90, the flue gas enters a particulate collector 96 such as a baghouse and/or electrostatic precipitator indicated at 96. Particulates also deposit on the tubes and other surfaces in the boiler 90.

The particulates from the boiler 90, together with the solids collected in the collector 96, are conveyed by suitable means indicated at 102 and 104 to a dissolver 100. Water is added to the dissolver 100 through conduit 106 where it mixes with material entering from lines 102 and 104. Soluble substances in the material entering the dissolver 100, such as the potassium sulfate, become dissolved in the resulting aqueous solution so that ionic specie including potassium ions and sulfate ions are present. Other soluble components of the collected material may include potassium sulfite, potassium chloride, and various compounds of silicon, aluminum, iron, titanium, calcium, magnesium, and sodium, in combination with various anions including sulfate, chloride, and fluoride anions. Many of these compounds have significant solubility in water and thus, ionic species other than the potassium and sulfate ions are likely to be present in the solution in significant quantities. Insoluble substances, mainly fly ash, will also be present in the solution.

The aqueous solution in dissolver 100, together with insoluble components, is transported via conduit 108 to a liquid-solid separator 110 which is preferably a horizontal continuous belt vacuum filter which removes insolubles from the solution in the manner described above with reference to the liquid-solid separator 36 of FIG. 1a. Solid material leaves the separator 110 as at 112 and is collected for disposal or further treatment indicated schematically at 114.

The aqueous solution, substantially free of solids, is transported in conduit 118 from the separator 110 to an ion exchange column 116 containing a fixed bed of the Amberlite IRA-68 resin, and movement of the fluid may be assisted by one or more pumps as indicated at 120. In the column 116, a process of ion exchange takes place in which the sulfate ions in the solution exchange with anion groups on the resin, preferably bicarbonate ions, so that the sulfate ions become associated with the resin and the bicarbonate ions become associated with the potassium ions in the solution, substantially as described above in the ion exchange process occurring in column 28 of FIG. 1. The solution exits the column 116 through conduit 122 and is directed therein to an evaporator/spray dryer 124 where the water is substantially removed and potassium bicarbonate is converted to a substantially dry potassium carbonate (powder) suitable for injection into the combustor 60 through conduit 74.

As described above with reference to FIG. 1, a number of the ion exchange columns 116 may be provided and connected between conduits 118 and 122 in parallel. Flow from conduit 118 to 122 is switched between the columns as they are exhausted t©insure a substantially uninterrupted flow of the potassium bicarbonate solution in conduit 122. A series of parallel columns may also be used.

It is noted that in the foregoing description of embodiments of the invention involving FGD processes, a quantity of water is required in order to dissolve the alkali metal sulfate so that the sulfate ions will be available for exchange with the bicarbonate ions. In industrial applications of this type, because of the great volumes of material involved, it is essential that water requirements be kept to a minimum and as a consequence it is desirable to carry out the method with the highest possible concentration of alkali metal sulfate in the solutions. In accordance with the present invention, it has been found that once-through conversion efficiencies of the alkali metal sulfate to the corresponding sulfate-free form in the order of 50% are achieved with inlet alkali metal sulfate concentrations of 10% by weight and higher, with conversion increasing rapidly as the concentration drops below about 2%.

Conversion rates in the range of 50% are unexpected with such high concentrations. Generally speaking, ion exchange resins have been used and thought to be effective only with very dilute solutions having concentrations below about 0.5% by weight and, as a result, one would not consider them for use in FGD or similar process where the alkali metal sulfate must be dissolved, because the water consumption would be prohibitive. The unexpectedly high conversion achieved in the present invention with relatively high concentrations of the alkali metal sulfates brings the water consumption down to acceptable levels.

It has further been found that the conversion is improved by buffering the incoming alkali metal sulfate solution from its normal pH below about 8 to the acid side at a pH below about 7 using a suitable buffering agent, acetic acid being preferred. For example, in the case of a 5% $K_2SO_4$ solution the addition over a given exhaustion cycle of acetic acid in an amount equal to about 5% (by volume) of the resin volume raises the conversion from about 60% to about 75%.

Figure 3A:
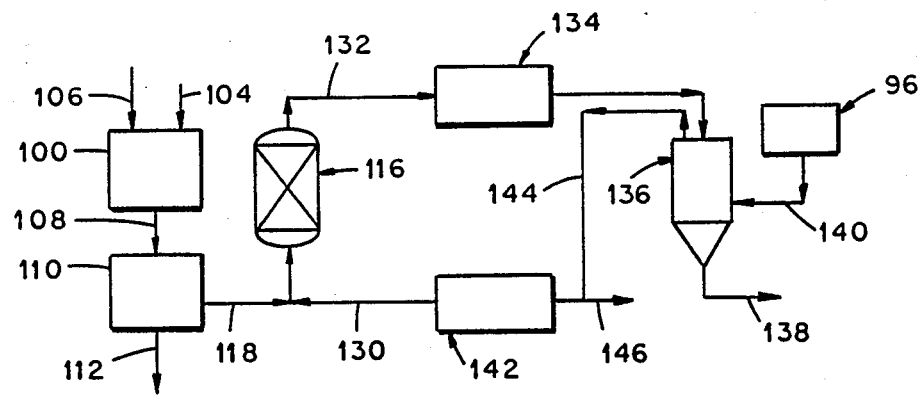
FIGS. 3a and 3b are flow diagrams illustrating portions of an ion exchange regeneration process for use in the process of the present invention.
Figure 3B:
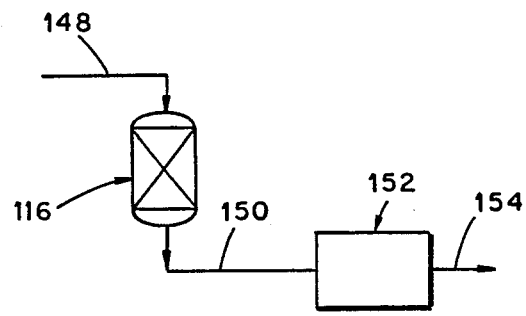
Figure 4:
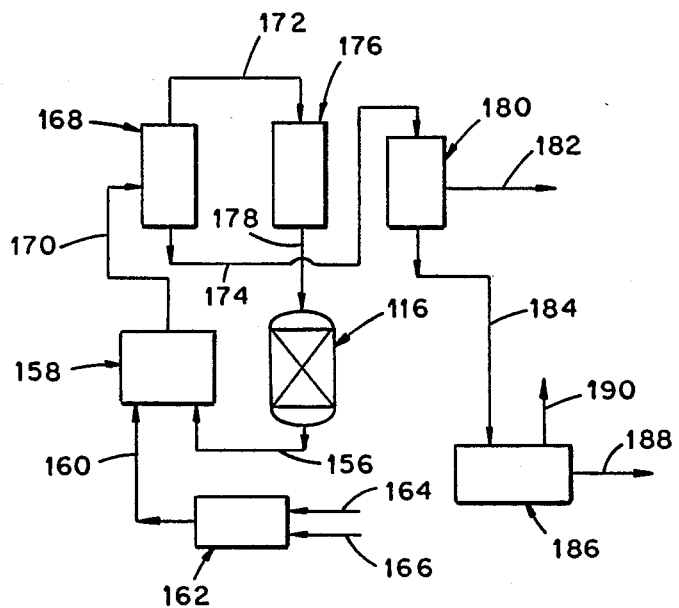
FIG. 4 is a flow diagram illustrating another form of the ion exchange resin regeneration process of FIGS. 3a and 3b.

Processes for regenerating the resin are illustrated in FIGS. 3a through 3b and in FIG. 4 in the context of the desulfurization method illustrated and described above with reference to FIG. 2, i.e., the MHD application. Before discussing the drawings and the specifics of the resin regeneration processes, it is noted that the regeneration in principle involves two basic steps. In the first step, the exhausted resin (in sulfate form) is converted to hydroxide form (free base resin) using a $NH_4OH$ solution according to the following equation:

$$R_2SO_4 + 2NH_4OH \rightarrow (NH_4)_2SO_4 + 2 ROH. \qquad (4)$$

The $(NH_4)_2SO_4$ that is produced can be sold as fertilizer or reacted with $Ca(OH)_2$ to recover ammonia for use in regenerating the resin to the hydroxide form.

The second and final step of the regeneration involves conversion of the resin from the free base form to the bicarbonate form. This can be accomplished using carbonated water (which may be carbonated using flue gas containing $CO_2$) the reaction being generally as follows:

$$ROH + CO_2 \rightarrow RHCO_3 \; (+ R_2CO_3). \tag{5}$$

In the embodiment of the invention involving FGD, it is preferred that the second step be carried out using $CO_2$—rich flue gas which offers economic advantages and can also be carried out simultaneously with the exhaustion as described below, so that only one independent processing step (conversion to the free base form) is required.

FIGS. 3a and 3b illustrate the regeneration process without ammonia recovery to yield an ammonium sulfate by-product. There, the aqueous solution containing dissolved alkali metal sulfate, in this case potassium sulfate, is directed into the ion exchange column 116 from the solid-liquid separator 110 via conduit 118. The resin is in the free base or hydroxide form, i.e., it is only partially regenerated. A gaseous stream under a slightly elevated pressure and rich in carbon dioxide is mixed with the solution entering the column 116 in conduit 118, via conduit 130. The carbon dioxide may be obtained from the hot flue gases produced in the MHD process as will be described.

In the ion exchange column 116, two reactions occur simultaneously. In the first of the two reactions, carbon dioxide reacts with partially regenerated resin which is in the hydroxide form to convert the resin to a bicarbonate form according to Equation 5 above. In the second reaction, the sulfate ions in the aqueous solution exchange with the bicarbonate ions to yield a solution containing predominantly potassium and bicarbonate ions according to Equation 2 above, this solution leaving from the top of the column 116 in conduit 132. The solution in conduit 132 is conducted to a concentrator 134, preferably a multistage evaporator and spray dryer unit, to yield a dry product comprising predominantly potassium carbonate which is conducted away from spray dryer as indicated at 138 (corresponding to line 74 in FIG. 2) for recycle to the combustor 60.

Evaporation of water from the potassium bicarbonate/carbonate solution in the spray dryer 136 may be assisted through the use of hot flue gas exiting the particulate collector 96 of FIG. 2, the gas shown entering the spray dryer 136 in conduit 140 in FIG. 3. Contact between the flue gas and potassium carbonate solution adds moisture to the gas. To remove excess moisture, the gas is preferably conducted from the spray dryer 136 following contact with the potassium bicarbonate solution to a gas drying unit 142 via conduit 144. The dried gas, rich in carbon dioxide, leaves the unit 142 in conduit 130 and is mixed with the potassium sulfate solution entering the column 116 in conduit 118 as described above. The gas dryer 142 may be an absorption column or other suitable device and may be coupled with a gas storage facility so that an extra supply of carbon dioxide-rich gas can be maintained to ensure an uninterrupted flow of gas in conduit 130. The volume of gas in conduit 144 in excess of that required for mixing with the potassium sulfate solution may be returned to the MHD system in conduit 146.

FIG. 3b illustrates conversion of the resin (after exhaustion) from the sulfate to the free base (hydroxide) form. There, an ammonium hydroxide solution enters column 116 in conduit 148 and passes through the resin wherein sulfate ions from the resin exchange with the hydroxide ions in the solution and become associated with the ammonium ions in the solution leaving the column 116 in conduit 150. The ammonium sulfate solution in conduit 150 is passed to a multistage evaporator/spray dryer unit 152 to yield a commercially valuable powdered ammonium sulfate product indicated leaving the unit in conduit 154.

FIG. 4 illustrates regeneration of the resin with ammonia recovery. The resin exhaustion step involving simultaneous contact with the potassium sulfate and $CO_2$-containing flue gas is the same for this regeneration scheme as for the regeneration without recovery of ammonia described above with reference to FIGS. 3a and 3b, and is omitted from FIG. 4 for clarity. The process of FIG. 4 differs in the manner of treatment of the ammonium sulfate solution leaving column 116 during the first step of the regeneration.

In FIG. 4, the ammonium sulfate solution leaving the column 116 is conducted via conduit 156 to an eluate receiver 158 rather than the evaporator/drier 152 of FIG. 3b. In the receiver 158, a slurry of slaked lime is added to the ammonium sulfate solution via conduit 160. The slaked lime is produced in a conventional lime slaker indicated at 162 using a supply of lime and water entering as at 164 and 166, respectively.

The mixture formed in the eluate receiver 158 is pumped to an ammonia stripper 168 via conduit 170 to yield a gaseous stream of ammonia in conduit 172 and a liquid calcium sulfate (gypsum) slurry stream in conduit 174 according to the following reaction:

$$(NH_4)_2SO_4 + Ca(OH)_2 \rightarrow CaSO_4 + NH_3 + H_2O. \tag{6}$$

The ammonia gas is directed via conduit 172 to an ammonia absorber 176 to produce an ammonium hydroxide solution leaving in conduit 178, Which is connected to the ion exchange column 116 to provide the ammonium hydroxide solution for converting the resin from the sulfate to the free base (hydroxide) form. The stripper bottoms in conduit 174 are passed to a clarifier 180, and the water leaving as in conduit 182 may be recycled. The underflow stream from the clarifier 180 leaving in conduit 184 contains a substantial quantity of suspended calcium sulfate and is directed therein to a solid-liquid separator 186, preferably a continuous centrifuge, to produce a gypsum product as represented by line 188 for disposal or possible commercial use. A filtrate, predominantly water, indicated leaving the separator 186 as at 190, may be recycled together with the water produced in the clarifier 180 leaving in conduit 182.

It is noted that the resin regeneration schemes described above can also be used in the FGD process for the conventional coal-fired plant (FIG. 1) because even though the alkali metal cation of the solution exhausting the resin may be different, the form of the resin after exhaustion is the same; viz, the sulfate form. The same holds true for the other applications of the alkali metal sulfate desulfurization method of the invention.

The method of the present invention offers numerous advantages over known processes involving desulfurization of alkali metal sulfates. First is the simplicity of such a system. Only a few simple reactions are required and they occur predominantly in the aqueous phase in the ion exchange columns and, in connection with its FGD aspects, without the sludge problems associated with previous FGD processes carried out under aqueous conditions.

Operating conditions are mild (no need for elevated temperatures or high pressures), most of the process streams are aqueous solutions, and corrosion/erosion considerations are minimal. The sulfur removed by the process is in the form of either a relatively innocuous waste material (gypsum if ammonia recovery is used) or a salable product (ammonium sulfate if ammonia is not recovered). The ion exchange process is relatively safe, easy to operate, stable, and highly reliable. Labor costs to operate and maintain the process are low. Effective automated control of the system can be achieved using readily available instrumentation. Soluble impurities such as Cl—, F— and $NO_3$— containing salts are also easily removed by the process. And, overall, the process is environmentally benign.

The following examples are provided to further illustrate the present invention but are not intended to be limiting. Unless otherwise specified, all percentages are by weight. Also, in all of the following examples, the experimental setup includes a glass column 4.3 cm. In diameter and 39 cm. in height, having a small glass reservoir connected to the top and a stop cock valve at the bottom. A fixed bed containing a weak base, anion-exchange resin is placed in the column; i.e., Amberlite IRA-68. Solutions used for the tests are placed in the top reservoir and their flow rate through the column is monitored. Samples of the liquid effluent are collected at regular time intervals and the concentration of selected ionic species is determined by ion chromatography using a Dionex Model Auto QIC ion chromatograph available from the Dionex Company.

The resin as supplied is in a hydroxide form. However, to make sure that during delivery it did not lose its reactivity, about 200 ml of resin in a fixed bed configuration is treated with a 4% ammonium hydroxide solution by passing the solution through the bed at a flow rate of 0.28 ml/sec. The bed is then thoroughly rinsed with water. Approximately 300 milliliters of water is retained in the column and carbon dioxide is bubbled from the bottom of the column for one hour at a flow rate of 16 ml/sec. and a pressure of 14 to 15 psis to convert the resin to the carbonate form. The column is then flushed with fresh water and is ready for exhaustion. Resin in the exhausted form (sulfate form) is regenerated using the same procedures.

To determine the start of each run, the volume of effluent equal to the volume of water left in the voids of the resin prior to the test is subtracted.

EXAMPLE 1

Figure 5:
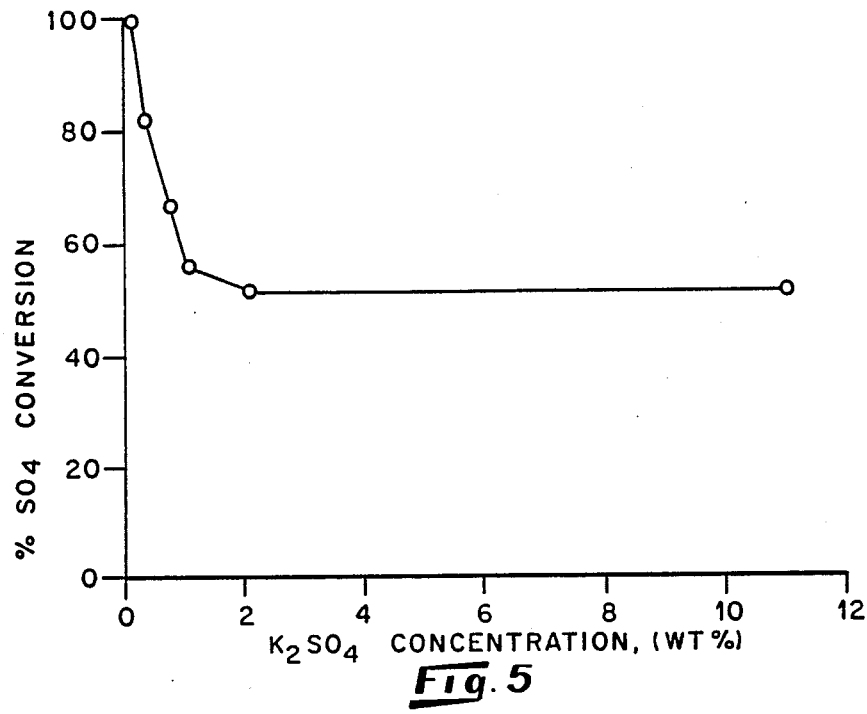
FIG. 5 is a graph illustrating percent sulfate conversion versus inlet potassium sulfate concentration.

Aqueous solutions of $K_2SO_4$ are prepared to give solutions of varying predetermined $K_2SO_4$ concentrations. In separate runs, the solutions are allowed to enter the bed from the reservoir at a flow rate of 0.28 ml/sec. The bed contains 50 ml. of fresh resin. The sulfate ion concentration in the effluent is measured every 5 minutes over a one-hour period to determine the percent sulfate conversion at the various inlet concentrations of potassium sulfate. The results are shown in FIG. 5.

EXAMPLE 2

Aqueous solutions of $K_2SO_4$ are prepared to provide aqueous solutions having varying sulfate ion concentrations. Each solution is allowed to enter a fresh resin bed containing 250 ml. of resin at a flow rate of 0.28 milliliters per second. Samples are taken from the effluent every 5 minutes and analyzed for sulfate ion concentration. Flow is continued until the concentration of sulfate ions in the effluent equals the concentration of sulfate ions in the solution entering the bed, $C_0$. The data are shown in FIG. 6.

The area under the curve is used to calculate the average sulfate concentration, $q_{oo}$, at equilibrium, with a given $C_0$. The resulting values of $q_{oo}$ versus $C_0$ are regressed by least square analysis to provide the best values of $a_1$, and $a_2$, the two parameters in the following Langmuir isotherm:

$$q_\infty = \frac{a_1 C_0}{1 + a_2 C_0} \quad (7)$$

Figure 6:
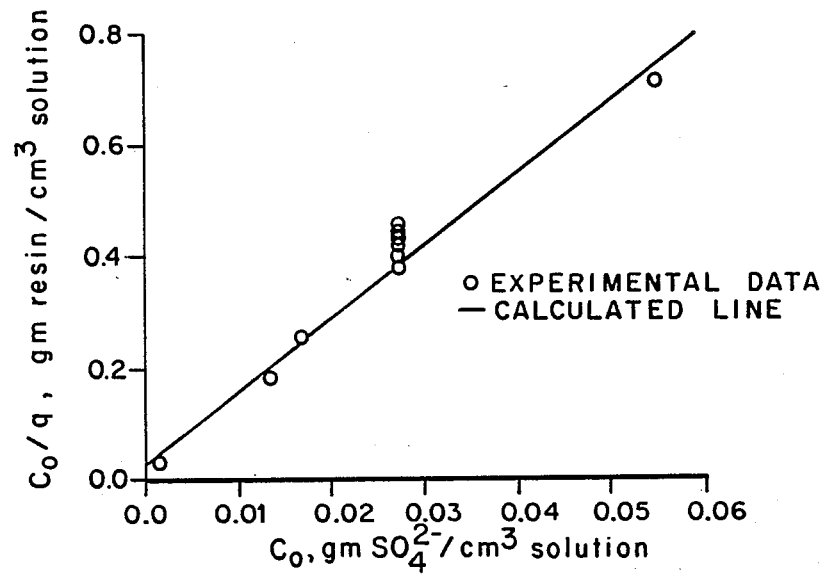
FIG. 6 is a graph illustrating the fit of a linearized Langmuir isotherm to experimental sulfate ion concentration data.

The least square fit to the experimental data is shown in FIG. 6 and is identified as the calculated line. The $a_1$ and $a_2$ parameters are 24.235 $cm^3/g$ resin and 318.72 $cm^3/g$ sulfate ions, respectively.

Figure 7:
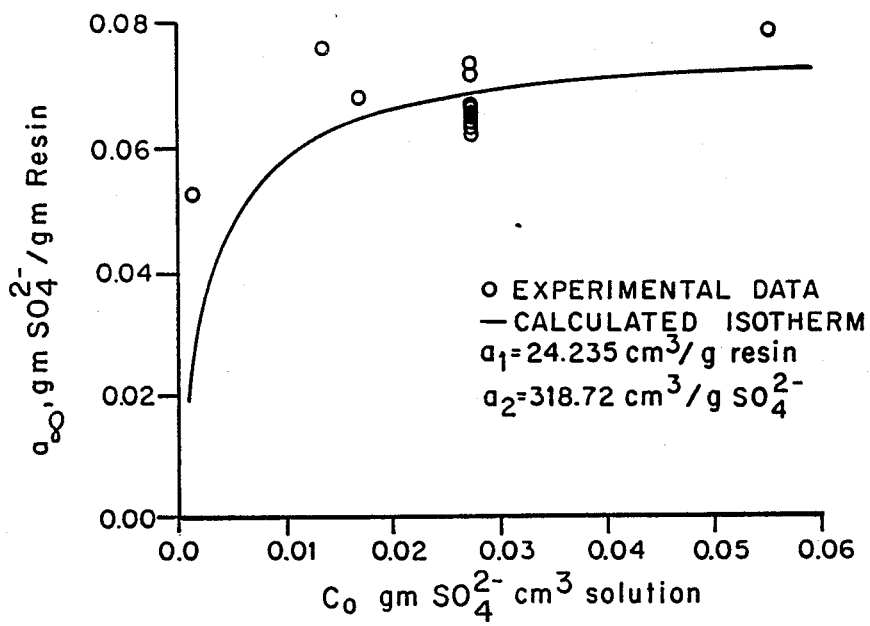
FIG. 7 is a graph illustrating a comparison of the Langmuir isotherm with experimental sulfate ion concentration data.

Based on this figure, it is seen that the resin removes up to 0.14 grams of potassium sulfate per milliliter of resin (equivalent to about 0.08 grams of sulfate ions per gram of resin) for solution concentrations of potassium sulfate ($C_0$) varying from about 2 to about 10 weight percent. comparison of the experimental data and the Langmuir isotherm calculated from the least square fitted values of $a_1$ and $a_2$ is shown in FIG. 7.

EXAMPLE 3

Figure 8:
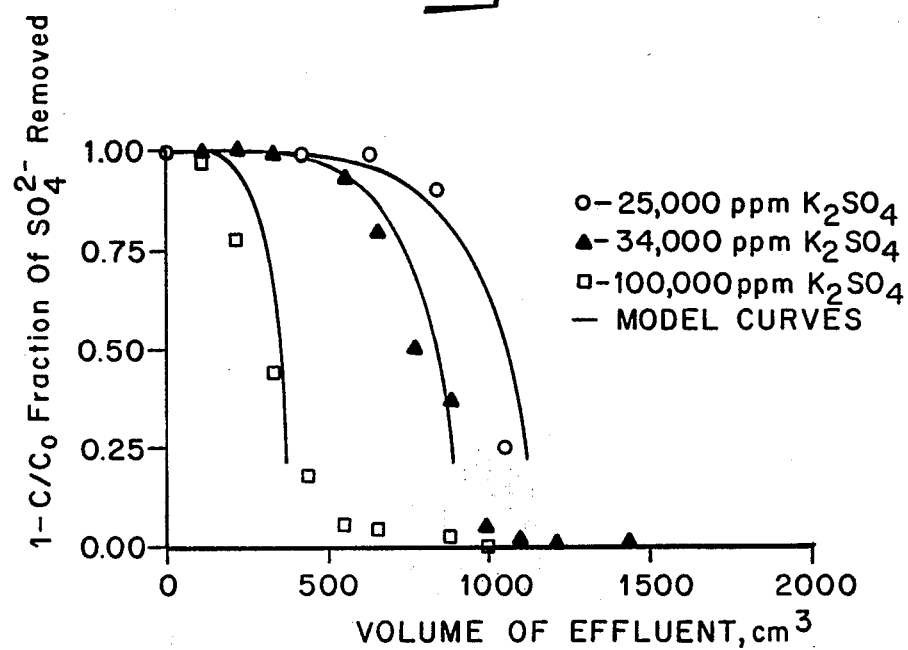
FIG. 8 is a graph illustrating a comparison of a mathematical sorption model for predicting sulfate ion concentration in the effluent with actual sulfate concentration in the incoming solution.

Three different solutions of $K_2SO_4$ are prepared with $K_2SO_4$ concentrations of 25,000, 34,000 and 100,000 ppm. Breakthrough curves are developed for each solution by passing the solution through the column with 200 milliliters of resin contained therein and at a flow rate of 0.28 milliliters per second. The volume of the resin is about 200 ml and the difference between the amount of the solution introduced into the column and the amount retained in the voids of the resin bed. In each case, flow is continued until breakthrough occurs (a detectable sulfate ion concentration is measured in the effluent). The data are shown in FIG. 8 together with breakthrough curves calculated based on the following sorption model:

$$\ln \frac{C}{C_0} = \frac{k_L S C_0}{q_\infty v} y - \frac{k_L S x}{V} - 1 \quad (8)$$

where
 c = concentration of sulfate ions in the effluent,
 $c_0$ = inlet concentration of sulfate ions,
 $k_L$ = liquid film mass transfer coefficient,
 $q_\infty$ = the solid phase equilibrium concentration of the sulfate ions at $C_0$ calculated from equation (7)
 S = the effective surface area of the resin,
 V = volumetric flow rate,
 x = the weight of the resin, and
 y = the difference between the amount of solution introduced into the column and the amount retained in the voids of the bed, up to x amount of resin;

where $k_L S = 0.00367 (u/0.0065)^{0.99}$ (cm$^3$/g resin·sec) for $u < 0.02$ cm/sec where u = the liquid superficial velocity; and where $k_L S = 0.011$ (cm$^3$/g resin·sec) for $u > 0.02$ cm/sec, for $C/C_0$ from between 0.05 and 0.8.

The data show close agreement between the experimental data and the model of Equation 8 except at the lower portion of the curves. The model of Equation 8 is derived under the assumption that the liquid film mass transfer mechanism is controlling which is an acceptable assumption for typical plant operating conditions. The probable explanation for the divergence at the lower portion of the breakthrough curve is the emergence of intraparticle diffusion as a significant factor in the mass transfer mechanism which is not taken into account in the sorption model used to calculate the curves.

EXAMPLE 4

Figure 9:
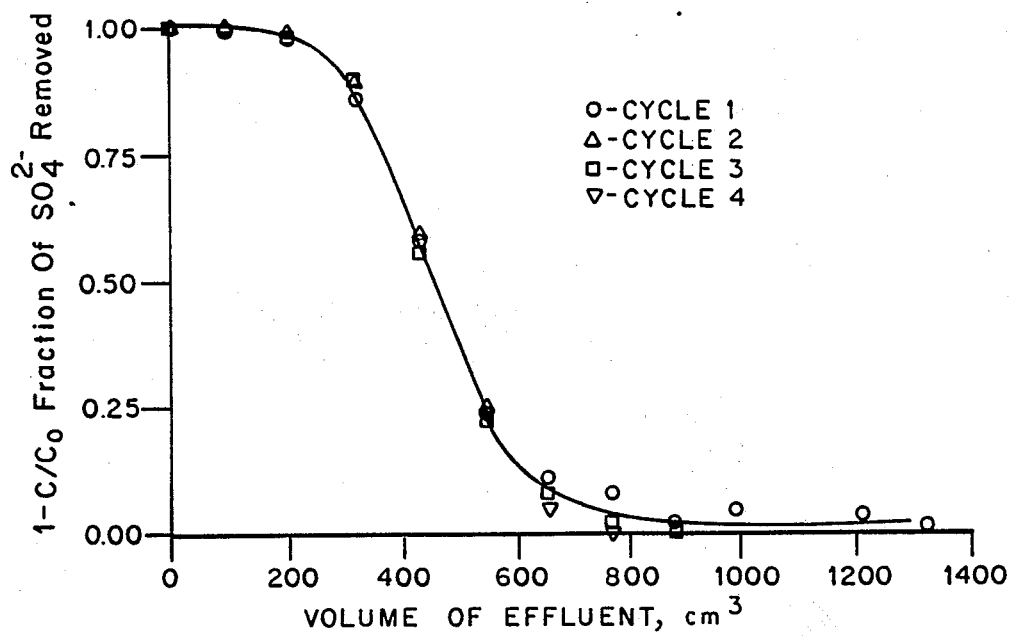
FIG. 9 is a graph illustrating cycle efficiency in the use of the ion exchange resin to remove the sulfate ions, and data reproducability in connection with use of the resin.

A 50,000 ppm $K_2SO_4$ solution is passed through the column containing 200 milliliters of fresh resin at a flow rate of 0.28 milliliters per second. Flow is continued until the concentration of sulfate ions in the effluent equals the concentration of sulfate ions in the solution, and samples are taken and analyzed for sulfate ion concentration at regular intervals of 5 minutes. This procedure is repeated three more times using the same resin which is regenerated prior to each run in order to evaluate the effect of cyclic operations. The results are shown in FIG. 9 which indicates no significant decrease in cycle efficiency over four cycles. FIG. 9 also shows experimental reproducibility in performing the same experiment four times.

EXAMPLE 5

Figure 10:
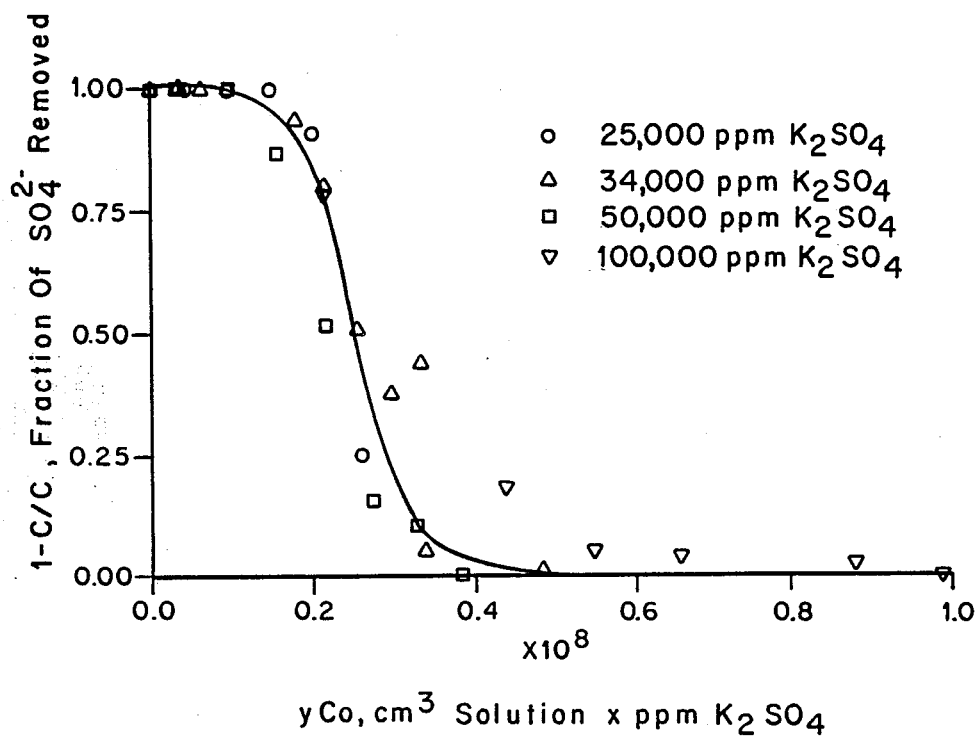
FIG. 10 is a graph illustrating the effect of inlet potassium sulfate concentration on the fraction of sulfate ions removed in an ion exchange resin.

Solutions of $K_2SO_4$ are prepared at concentrations of 25,000, 34,000, 50,000, and 100,000 ppm. The solutions are flowed through the resin bed containing 200 ml of resin at 0.28 milliliters per second until breakthrough occurs. The resulting breakthrough curves are shown in FIG. 10. For ease of comparison, the curves are plotted in terms of the initial concentration $C_0$ multiplied by the volume of the effluent as an abscissa.

EXAMPLE 6

A 50,000 ppm $K_2SO_4$ solution is passed through 200 milliliter beds of regenerated resin at superficial velocities of between 0.005 to 0.09 cm/s. The sulfate ion concentration in the effluent is measured every 5 min. to determine the breakthrough point. The results are shown in FIG. 11.

Figure 11:
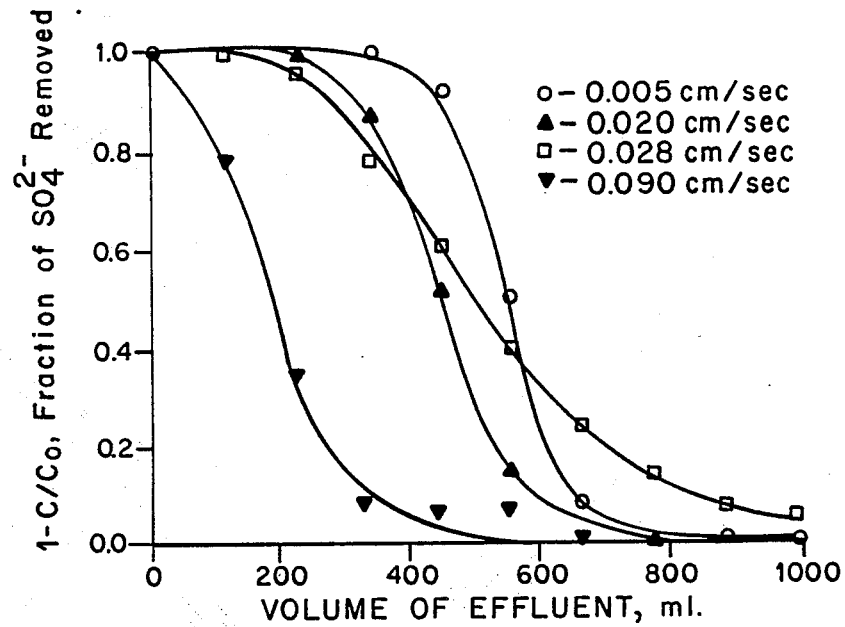
FIG. 11 is a graph illustrating the effect of superficial velocity on the fraction of sulfate ions removed in an ion exchange resin.

From FIG. 11, it is seen that best results are obtained with a superficial velocity of 0.005 cm/s and that increasing the superficial velocity to 0.09 cm/s decreases the resin efficiency considerably.

EXAMPLE 7

Figure 12:
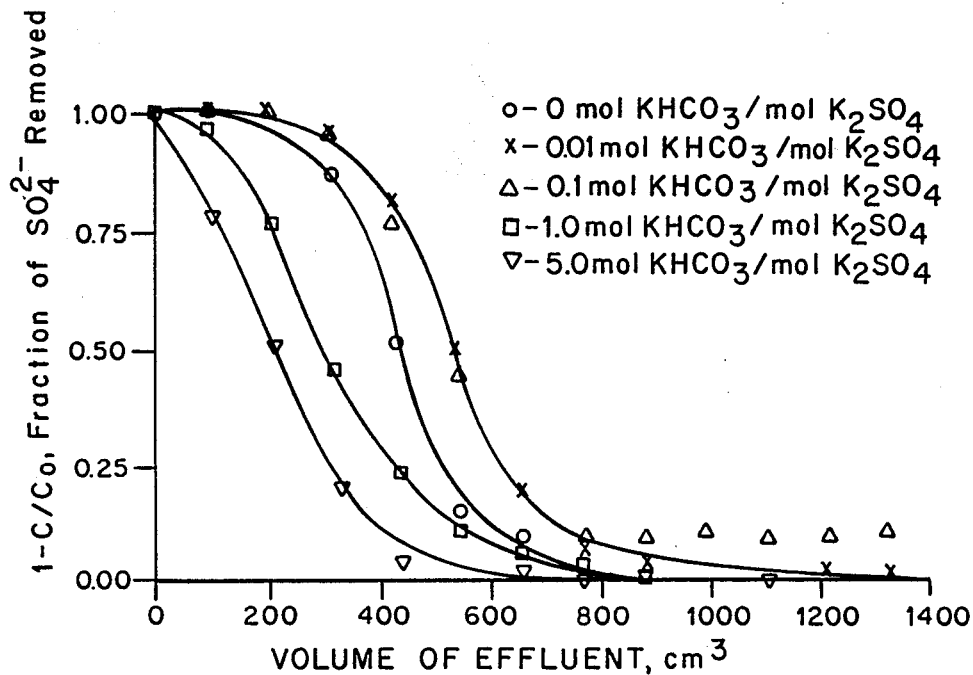
FIG. 12 is a graph illustrating the effect of potassium bicarbonate concentration on the fraction of sulfate ions removed by an ion exchange resin.

Five solutions containing a mixture of $KHCO_3$ and $K_2SO_4$ are prepared. In each solution, the concentration of $K_2SO_4$ is 50,000 ppm. However, the concentration of $KHCO_3$ is varied to determine the effect of product inhibition on the ion exchange kinetics for $K_2SO_4$ due to the presence of $KHCO_3$ in the solution. The solution concentrations in units of moles of $KHCO_3$ per mole of $K_2SO_4$ are 0, 0.01, 0.1, 1.0 and 5.0. Each solution is passed through 200 ml of fresh resin and the sulfate ion concentration in the effluent is measured at regular 5 minute intervals to provide a breakthrough curve for each solution. These curves are shown in FIG. 12 which illustrates the effect of the various $KHCO_3$ concentrations on the average equilibrium concentration $q_\infty$ for the sulfate ion in the resin.

Based on these results, the maximum acceptable concentration of $KHCO_3$ in a 50,000 ppm $K_2SO_4$ solution is 0.1 mole of $KHCO_3$ per mole of $K_2SO_4$ in order to avoid adverse effects on the resin performance.

EXAMPLE 8

An aqueous solution containing dissolved $K_2SO_4$ is prepared by obtaining a composite spent seed/fly ash sample (identified as LMF-4E) from the baghouse and electrostatic precipitator components of the University of Tennessee Space Institute Coal-Fired Flow Facility at Tullahoma, Tenn. and mixing the sample with deionized water to obtain a $K_2SO_4$ concentration of approximately 34,000 ppm. More than 3000 milliliters of the solution are prepared to enable three successive cycles of resin exhaustion using the same initial batch.

The resulting mixture is filtered to remove substantially all of the insoluble fly ash material suspended in the solution. Table 1 contains the elemental and ash composition of the spent seed/fly ash mixture (in its dry form) and Table 2 contains the chemical composition of the actual spent seed solution following filtration.

TABLE 1

| Physical Characteristics of the LMF-4E Spent Seed/Fly Ash Mixture | |
|---|---|
| Component | Weight % |
| Moisture | 0.12 |
| Total Ash | 99.4 |
| Total Sulfur | 16.0 (dry basis) |
| Carbon | 0.43 (dry basis) |
| Hydrogen | 0.08 (dry basis) |
| Nitrogen | 0.04 (dry basis) |
| Element Analysis (Ignited ash basis) | Weight % in Ash (dry basis) |
| $Al_2O_3$ | 1.49 |
| $Fe_2O_3$ | 4.44 |
| $TiO_2$ | 0.24 |
| CaO | 0.69 |
| MgO | 0.12 |
| $Na_2O$ | 0.36 |
| $K_2O$ | 49.7 |
| $SO_3$ | 43.0 |

TABLE 2

| Chemical Composition of the Spent Seed/Fly Ash Mixture In Aqueous Solution Following Filtration | |
|---|---|
| Major Cations/Elements | Concentration (ppm) |
| Silicon | 5 |
| Aluminum | 5 |
| Iron | 0.1 |
| Titanium | Not Detected |
| Calcium | 112 |
| Magnesium | 10 |
| Sodium | 81 |
| Potassium | 15300 |
| Major Anions | Concentration (ppm) |
| $SO_4^{2-}$ | 18800 |
| Cl— | 50 |
| F— | 31 |

A fourth solution is prepared using reagent grade $K_2SO_4$ and has a concentration of approximately 34,000 ppm.

Figure 13:
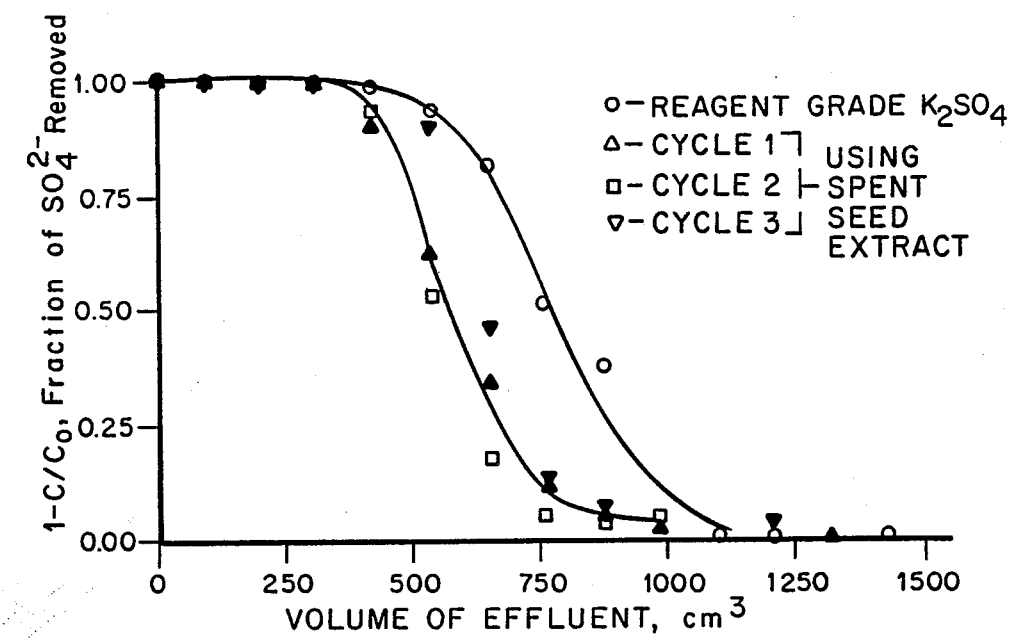
FIG. 13 is a graph illustrating sulfate ion removal data in connection with the desulfurization of spent seed material obtained from an MHD process.

FIG. 13 shows the breakthrough curves for the three cycles using the spent seed/fly ash solution as well as the breakthrough curve obtained using the reagent grade $K_2SO_4$ solution.

The concentrations of $Cl^-$ and $F^-$ ions in the untreated solution, and in the effluent, were also measured along with that of the sulfate ion at the beginning of each run. The results are shown in Table 3 to illustrate simultaneous removal of $Cl^-$ and $F^-$ ions with sulfate ions.

TABLE 3

| Simultaneous Removal of $SO_4^{2-}$, $Cl^-$ and $F^-$ Ions | | | |
|---|---|---|---|
| Solution | Sulfate Ion (ppm) | $Cl^-$ Ion (ppm) | $F^-$ Ion (ppm) |
| Initial/Untreated | 18000 | 50 | 31 |
| Treated | 0 | 3 | 19 |

FIG. 13 shows that the resin is somewhat less effective in extracting sulfate ions from the spent seed/fly ash solution than the solution containing reagent grade $K_2SO_4$. Also, the results provided in Table 3 show that the resin also simultaneously removes $Cl^-$ and $F^-$ ions.

It is believed that the $Cl^-$ and $F^-$ ions present in the solution affected the breakthrough curves for the sulfate ion by shifting them to the left as can be seen in FIG. 13 when the breakthrough curve for the spent seed/fly ash solution is compared to the breakthrough curve for the reagent grade $K_2SO_4$ solution. However, it is noted that the breakthrough curves for the pure reagent grade $K_2SO_4$ solution and the breakthrough curve for the spent seedfly ash solution are very similar implying that the effect of dissolved impurities such as $Cl^-$ and $F^-$ ions on the ion exchange kinetics of sulfate ion is negligible.

EXAMPLE 9

A 5% $K_2SO_4$ solution is prepared and separated into five separate portions. The solution has a pH of about 7.0. Each portion is flowed through a freshly regenerated 200 ml resin bed at a flow rate of 0.28 ml/sec over a one hour period. Before contact With the resin, acetic acid is added to two of the portions in an amount equal to about 1% by volume based an the volume of the resin, and is added to one of the other portions in an amount equal to about 5% by volume based on the volume of the resin. No acetic acid is added to the remaining two portions.

The pH of the solution decreased as the amount of acetic acid increased from 1% acetic acid to 5% acetic acid.

Figure 14:
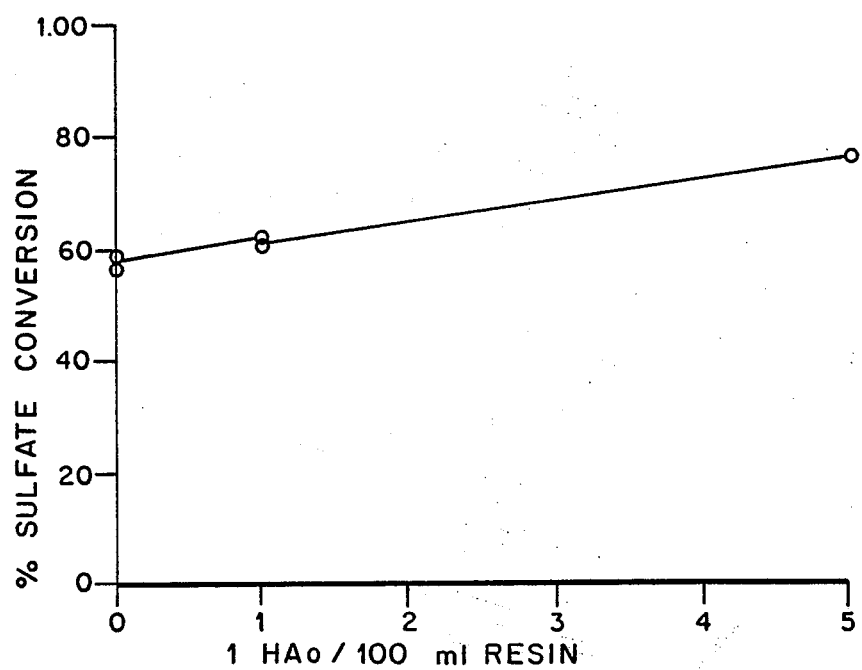
FIG. 14 is a graph illustrating the use of acetic acid in the alkali metal sulfate solution to increase the percentage of sulfate ions removed by the resin.

The percentage of sulfate ions removed from the solutions is determined by analyzing the effluent for sulfate ion concentration every 5 min. The results are provided in FIG. 14 which shows that a 15% increase in the percentage of sulfate ions removed is achieved with addition of 5% acetic acid.

Although preferred embodiments of the present invention have been described in tho foregoing detailed description, it will be understood that the invention is capable of numerous rearrangements, modifications, substitutions and alterations without departing from the scope and spirit of the following claims.

What is claimed is:

1. A process for desulfurizing an alkali metal sulfate comprising providing the alkali metal sulfate in dissolved form in an aqueous solution having a pH of less than about 8 so that sulfate ions and alkali metal ions are present in the solution, and contacting the aqueous solution with a weak base anion exchange resin having bicarbonate groups associated therewith that exchange with the sulfate ions in the solution so that the sulfate ions become associated with resin and the bicarbonate groups become associated with the alkali metal ions in the solution.

2. The process of claim 1 wherein the method further comprises forming the bicarbonate groups on the resin by reacting hydroxide groups associated with the resin with carbon dioxide substantially contemporaneously with contact between the resin and the aqueous solution including the sulfate and alkali metal ions.

3. The process of claim 1 wherein the resin having sulfate ions associated therewith is converted back to the bicarbonate form by contacting the resin having sulfate ions associated therewith with an aqueous solution of ammonium hydroxide so that hydroxide ions from the solution become associated with the resin in place of the sulfate ions which become associated with the ammonium ions in the solution, and then contacting the resin having hydroxide ions associated therewith with carbon dioxide to convert the hydroxide ions to bicarbonate ions.

4. The process of claim 3, wherein the resin having hydroxide ions association therewith is contacted with carbon dioxide as the resin is contacted with the aqueous solution including alkali metal ions and sulfate ions.

5. The process of claim 1, wherein the pH of the aqueous solutions contacting the resin is buffered to an acidic pH below about 7.0.

6. The method of claim 1, wherein the concentration of alkali metal sulfate in the solution is in the range of about 2 to about 10% by weight based on the total weight of the solution.

7. The method of claim 1 wherein the aqueous solution contacting the resin also includes the alkali metal and the bicarbonate groups and the method further comprises maintaining the amount of the dissolved alkali metal bicarbonate in the solution below about 0.1 mole per mole of the alkali metal sulfate.

8. The method of claim 7, wherein the alkali metal is potassium.

9. The method of claim 1, wherein the aqueous solution is contacted with resin by passing it through a fixed bed of the resin at a superficial flow velocity below about 0.03 cm/sec.

10. A method for desulfurizing flue gas produced in a fossil fuel combustion process, comprising:
adding to the combustion process a sulphur-free alkali metal compound selected from the class consisting of alkali metal carbonates and alkali metal bicarbonates, the alkali metal compound reacting with sulfur dioxide present in the flue gas to form an alkali metal sulfate;
dissolving the alkali metal sulfate in water to produce an aqueous solution thereof having a pH less than about 8.0 including sulfate ions and alkali metals ions;
contacting the aqueous solution with a weak base, anion-exchange resin having bicarbonate groups associated therewith that exchange with the sulfate ions in the solution so that the sulfate ions become associated with the resin and the bicarbonate groups become associated the alkali metal ions in the solution; and
recycling the solution containing the alkali metal ions and bicarbonate groups to the combustion process, whereby the flue gas is desulfurized and waste of the alkali metal is minimized.

11. The method of claim 10, wherein the bicarbonate groups are formed substantially simultaneously as the aqueous solution including sulfate and alkali metal ions is contacted with the resin by utilizing carbon dioxide contained in the flue gas and reacting the same with hydroxide groups associated with the resin to produce the bicarbonate groups.

12. The method of claim 10, wherein the alkali metal compound is selected from the class consisting of potassium bicarbonate, potassium carbonate, sodium bicarbonate and sodium carbonate.

13. The method of claim 10, wherein the method further comprises regenerating the resin to replace bicarbonate groups that are exchanged with sulfate ions according to a regeneration process which comprises contacting the resin with an aqueous solution including ammonium ions and hydroxide ions so that the sulfate ions on the resin become associated with the ammonium ions in the solution to form ammonium sulfate in the solution and the hydroxide ions become associated with the resin, and utilizing carbon dioxide contained in the flue gas to convert the hydroxide ions associated with the resin to bicarbonate ions according to the reaction between carbon dioxide and a hydroxide ion to form bicarbonate ions.

14. The method of claim 13, wherein the hydroxide ions associated with the resin are converted to bicarbonate groups as the aqueous solution including sulfate and alkali metal ions is contacted with the resin so that the regeneration of the resin is accomplished, at least in part, substantially contemporaneously with the exchange of the bicarbonate groups.

15. The process of claim 10, wherein the concentration of the alkali metal sulfate in the aqueous solution is in the range of from about 2 to about 10 weight percent based on the total weight of the solution.

16. The process of claim 10, wherein the pH of the aqueous solution containing the resin is buffered to an acidic pH less than about 8.

17. The method of claim 10, wherein the aqueous solution contacting the resin also includes the alkali metal and the bicarbonate ions, the method further comprising maintaining the amount of the dissolved alkali metal bicarbonate in the solution below about 0.1 mole per mole of the alkali metal sulfate.

18. The method of claim 17, wherein the alkali metal is potassium.

19. The method of claim 10, wherein the aqueous solution is contacted with resin by passing it through a fixed bed of the resin at a superficial flow velocity below about 0.03 cm/sec.

20. In a coal-fired magnetohydrodynamic process for generating electricity which includes the steps of combusting the coal to produce a high temperature, high velocity combustion gas including sulfur dioxide, seeding the combustion gas with a non-sulphur alkali metal compound selected from the class consisting of alkali metal carbonates and alkali metal bicarbonates, the alkali metal compound reacting with sulfur dioxide to form an alkali metal sulfate and to increase the electrical conductivity of the combustion gas by thermal ionization, interacting the high velocity, high temperature seeded combustion gas with a magnetic field to induce a voltage, tapping the voltage to provide a flow of electricity, and removing the alkali metal sulfate from the combustion gas, the improvement which comprises dissolving the alkali metal sulfate in water to produce an aqueous solution thereof including sulfate ions and alkali metal ions, contacting the aqueous solution with a weak base, anion exchange resin having bicarbonate groups associated therewith that exchange with the sulfate ions in the solution so that the sulfate ions become associated with the resin and the bicarbonate groups become associated with the alkali metal ions in the solution, and recycling the solution containing the alkali metal ions and bicarbonate ions to seed the combustion gas, whereby sulphur dioxide is removed from the combustion gas and waste of the alkali metal is minimized.

21. The method of claim 20, wherein the alkali metal compound is selected from the class consisting of potassium bicarbonate, potassium carbonate and cesium carbonate.

22. The method of claim 20, wherein the bicarbonate groups are formed substantially simultaneously as the aqueous solution including sulfate and alkali metal ions is contacted with the resin by utilizing carbon dioxide contained in the flue gas and reacting the same with hydroxide groups associated with the resin to produce the bicarbonate groups.

23. The method of claim 20, wherein the concentration of the alkali metal sulfate in the aqueous solution is in the range of from 2 to about 10 weight percent based on the total weight of the solution.

24. The process of claim 20, wherein the pH of the aqueous solution contacting the resin is buffered to an acidic pH below about 7.

25. The method of claim 20, wherein the aqueous solution contacting the resin also includes the alkali metal ions and the bicarbonate groups, and the method further comprises maintaining the amount of the dissolved alkali metal bicarbonate in the solution below about 0.1 mole per mole of the alkali metal surface to minimize product inhibition.

26. The method of claim 25, wherein the alkali metal is potassium.

27. The method of claim 20, wherein the aqueous solution is contacted with resin by passing it through a fixed bed of the resin at a superficial flow velocity of below about 0.03 cm/sec.

* * * * *

UNITED STATES PATENT AND TRADEMARK OFFICE
CERTIFICATE OF CORRECTION

PATENT NO. : 4,917,874
DATED : April 17, 1990
INVENTOR(S) : Atul C. Sheth and William A. Butler It is certified that error appears in the above-identified patent and that said Letters Patent is hereby corrected as shown below:

Column 1, line 40, "(PCD)" should be --(FGD)--.

Column 2, line 42, after "provide" delete --an--.

Column 3, line 28, after "desulfurizing" delete --a--.

Column 8, line 13, after "exhausted" delete "tc" and insert --to--.

Column 10, line 43, "Which" should be --which--.

Column 11, line 49, "psis" should be --psia--.

Column 12, line 33, after "percent." insert --A--.

Column 15, line 31, "seedfly" should be --seed/fly--.

Column 15, line 41, "With" should be --with--.

Column 15, line 58, "tho" should be --the--.

Claim 16, column 17, line 40, "containing" should be --contacting--.

Claim 17, column 17, line 45, after "dissolved" delete --a--.

Signed and Sealed this

First Day of October, 1991

Attest:

HARRY F. MANBECK, JR.

Attesting Officer

Commissioner of Patents and Trademarks